United States Patent [19]  
Schmidt

[11] Patent Number: 4,741,653  
[45] Date of Patent: May 3, 1988

[54] CARGO SECURING MEANS

[75] Inventor: Thomas F. Schmidt, Jonesboro, Ark.

[73] Assignee: Joyce Catherine Schmidt, Jonesboro, Ark.

[21] Appl. No.: 925,085

[22] Filed: Oct. 30, 1986

[51] Int. Cl.⁴ .............................................. B60P 7/08
[52] U.S. Cl. ...................................... 410/111; 410/112
[58] Field of Search ................... 114/218, 75; 410/101, 410/102, 109–114, 120

[56] References Cited  
U.S. PATENT DOCUMENTS

| | | | |
|---|---|---|---|
| 2,532,743 | 12/1950 | Storch | 410/111 |
| 2,729,417 | 1/1956 | Maynard | 410/111 |
| 3,241,500 | 3/1966 | Simpson et al. | 410/111 |
| 3,643,973 | 2/1972 | Bott | 410/101 |
| 3,709,156 | 1/1973 | Bowers | 410/111 |
| 3,814,029 | 6/1974 | McNally et al. | 410/111 |

FOREIGN PATENT DOCUMENTS 44092 3/1930 Denmark ........................... 114/218

Primary Examiner—Joseph F. Peters, Jr.  
Assistant Examiner—Stephen P. Avila  
Attorney, Agent, or Firm—Walker & McKenzie

[57] ABSTRACT

A plurality of securing devices are attached to a supporting member for use in securing cargo to the supporting member. Each device includes a body member for being attached to the supporting member and an arm member pivotally attached to the body member for movement between a down position in which all of the arm member is positioned below the support plane of the supporting member so as not to interfere with the use of the supporting member and an up position in which a portion of the first end of the arm member extends above the support plane of the supporting member to allow the cargo to be secured relative thereto.

6 Claims, 4 Drawing Sheets

CARGO SECURING MEANS

BACKGROUND OF THE INVENTION

1. Field of the Invention

The present invention relates, in general, to means for securing cargo relative to a supporting member, such as the bed of a typical pickup truck.

2. Description of the Related Art

A preliminary patentability search conducted in Class 410, subclasses 101, 107, 109–114, and 120 disclosed the following patents: Storch, U.S. Pat. No. 2,532,743; Maynard, U.S. Pat. No. 2,729,417; Simpson et al, U.S. Pat. No. 3,241,500; and Bowers, U.S. Pat. No. 3,709,156. None of the above patents disclose or suggest the present invention.

Cleats, siderails, and the like have heretofore been attached along the tops of the sidewalls of pickup truck beds and the like for use in conjunction with rope or the like to secure or tie down cargo within the pickup truck bed. Simpson et al, U.S. Pat. No. 3,241,500 and Storch, U.S. Pat. No. 2,532,743 disclose devices including rings that may be attached to a supporting surface for use in anchoring cargo to the supporting surface. Maynard discloses a retractable spring device for use in securing cargo or the like to a supporting member. Bowers, U.S. Pat. No. 3,709,156 discloses a cargo-securing member for being attached to the deck of a vessel and having an eye member movable between a plurality of positions either above or below the deck to aid in securing cargo either above or below the deck.

SUMMARY OF THE INVENTION

The present invention is directed toward providing an improved means for use with a supporting member, such as the bed of a pickup truck, to secure cargo relative to the supporting member. The concept of the present invention is to provide a simple, maintenance-free means movable between a down position in which no portion thereof extends above the supporting member and an up position in which a portion thereof extends above the supporting member for allowing a flexible, elongated member to be attached thereto, etc.

The cargo securing means of the present invention includes at least one securing device comprising, in general, a body member for being attached to a supporting member; an arm member having first and second ends; and pivot means pivotally attaching the arm member to the body member for allowing the first end of the arm member to pivot between a down position in which none of the device extends above the supporting member and an up position in which at least a portion of the first end of the arm member extends above the supporting member for allowing cargo to be secured relative thereto.

DESCRIPTION OF THE PREFERRED EMBODIMENT

Figure 2:
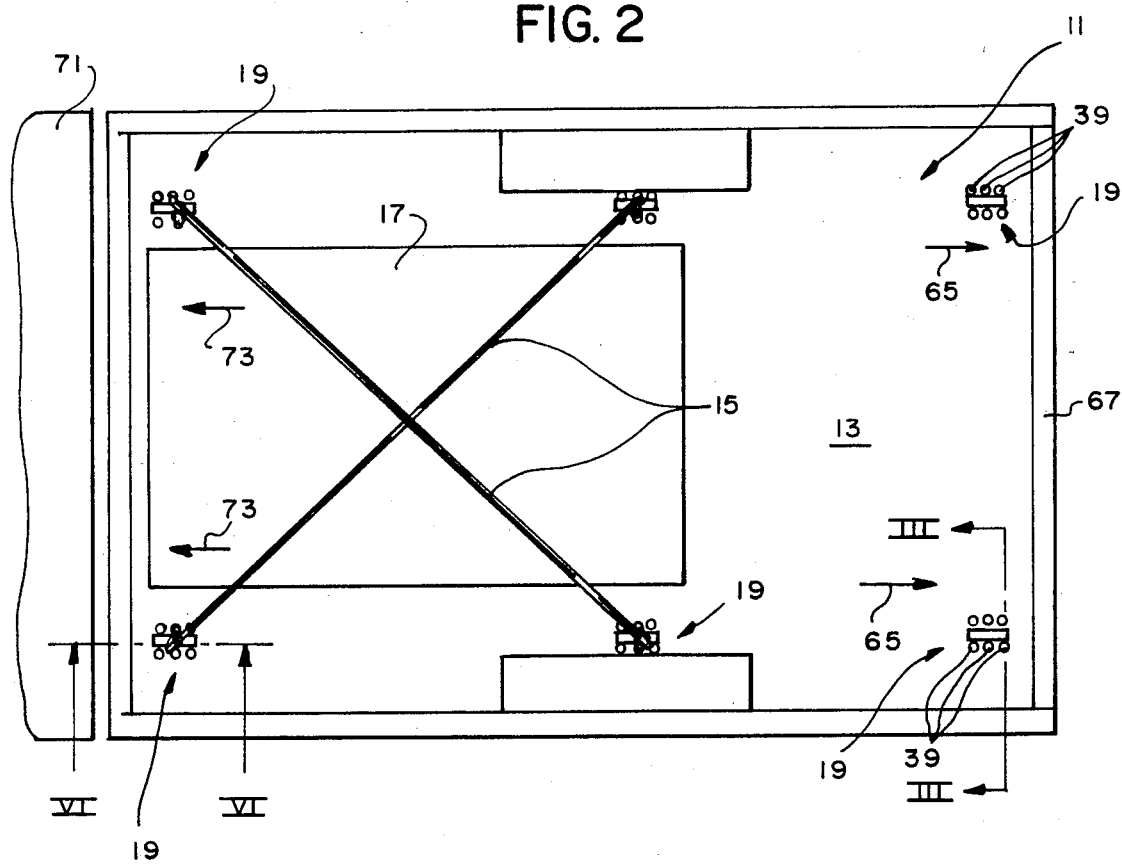
FIG. 2 is a top plan view of the bed of a pickup truck or the like showing a plurality of the securing devices of the means of the present invention coupled thereto.

The cargo securing means 11 of the present invention is for use with a supporting member 13, such as the floor of a pickup truck bed, van, trailer, etc., and with a flexible elongated member, such as a rope 15 to secure cargo 17 relative to the supporting member 13 (see FIG. 2). The securing means 11 includes at least one and preferably a plurality of securing devices 19 attached to the supporting member 13 for movement between a down position in which no portion of the device 19 extends above the supporting member 13 and an up position in which a portion of the device 19 extends above the supporting member 13 to allow the cargo 17 to be secured relative thereto. Each device 19 includes, in general, a body member 21 for being attached to the supporting member 13, an arm member 23, and pivot means 25 pivotally attaching the arm member 23 to the body member 21 for allowing the arm member 23 to pivot between a down position in which none of the arm member 23 extends above the supporting member 13 and an up position in which a portion of the arm member 23 extends above the supporting member 13.

The body member 21 preferably includes a pair of spacedapart, parallel side members 27, 29, a bridge member 31 rigidly joining the side members 27, 29 to one another, and a pair of flange members 33, 35 rigidly attached respectively to the side members 27, 29 for allowing the body member 21 to be attached to the supporting member 13 in a manner which will hereinafter become apparent. The side members 27, 29, bridge member 31 and flange members 33, 35 are preferably cast or otherwise manufactured out of metal, such as aluminum, as an integral, one-piece unit. A plurality of spaced-apart, threaded apertures 37 are preferably provided in each flange member 33, 35 to allow the body member 21 to be fixedly attached to the supporting member 13 with screws 39.

The arm member 23 has a first end 41 and a second end 43 and preferably has an enlarged aperture 45 through the first end 41 for allowing the rope 15 to be attached or extend therethrough. The arm member 23 may be cast or otherwise manufactured out of a corrosion-resistant metal alloy, or the like, with a thickness for allowing the arm member 23 to be positioned between the side members 27, 29 of the body member 21 with sufficient clearance therebetween to allow free movement of the arm member 23 between the up and down position. The device 19 is preferably sized so as to provide one-sixteenth inch (1.59 mm) space between each side of the arm member 23 and the adjacent side of the respective side members 27, 29.

The pivot means 25 may include a bolt 47 for extending through apertures 49 in the side members 27, 29 of the body member 21 and through an aperture 51 in the arm member 23 whereby the arm member 23 is free to pivot between the down position and the up position. A nut 53 may be provided to secure the bolt 57 to the body member 21.

Spring means 55 may be provided for normally urging the arm member 23 to the down position. The spring means 55 may be of various specific constructions and may be attached to the arm member 23 in various specific manners as will now be apparent to those of ordinary skill in the art. Thus, the spring means 55 may be a coil-type spring having ends bent at right angles to the body of the spring for being secured within apertures 56 in the body member 21 and arm member 23 to thereby normally urge the arm member 23 to the down position as will now be apparent to those of ordinary skill in the art. It should be noted that the arm member 23 will normally fall to the down position without the help of the spring means 55 due to the off-center location of the pivot means 25 as shown in the drawings in a manner as will be apparent to those skilled in the art so that the spring means 55 may be omitted without departing from the spirit and scope of the present invention.

Figure 4:
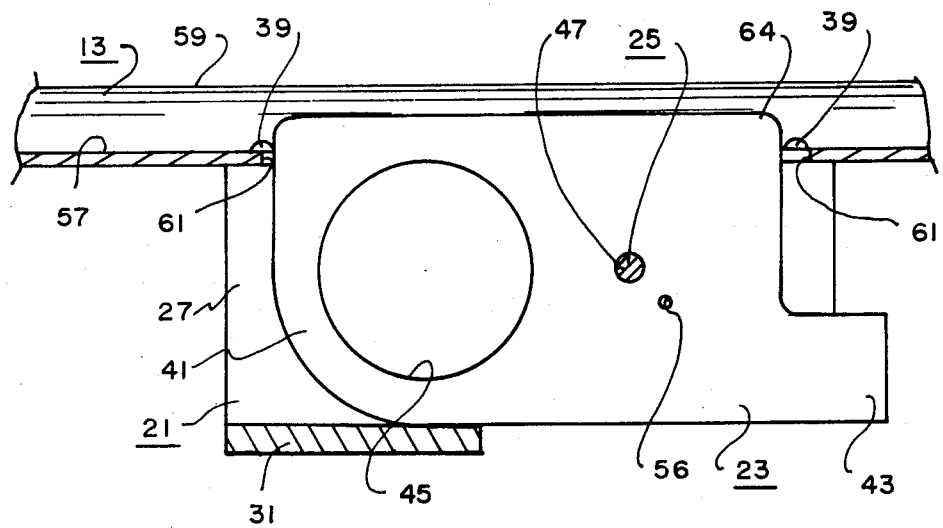
FIG. 4 is a sectional view substantially as taken on line IV—IV of FIG. 3.

The bridge member 31 is preferably located so as to define a stop means for coacting with the second end 43 of the arm member 23 to stop the arm member 23 in the up position (see, in general, FIG. 5) and for coacting with the first end 41 of the arm member 23 to stop the arm member 23 in the down position (see, in general, FIG. 4).

The supporting member 13 is preferably of the type having a corrugated support surface with a plurality of valleys 57 and adjacent ridges 59. Thus, the tops of the ridges 59 define the support surface or support plane SP of the supporting member 13 (see FIG. 3) with the cargo 17 resting on a plurality of the ridges 59. An elongated slot 61 is preferably formed in a valley 57 at the location where it is desired to locate a device 19. The slot 61 should be just wide enough and just long enough for allowing the first end 41 of the arm member 23 to extend therethrough when moving between the up and down positions.

Figure 1:
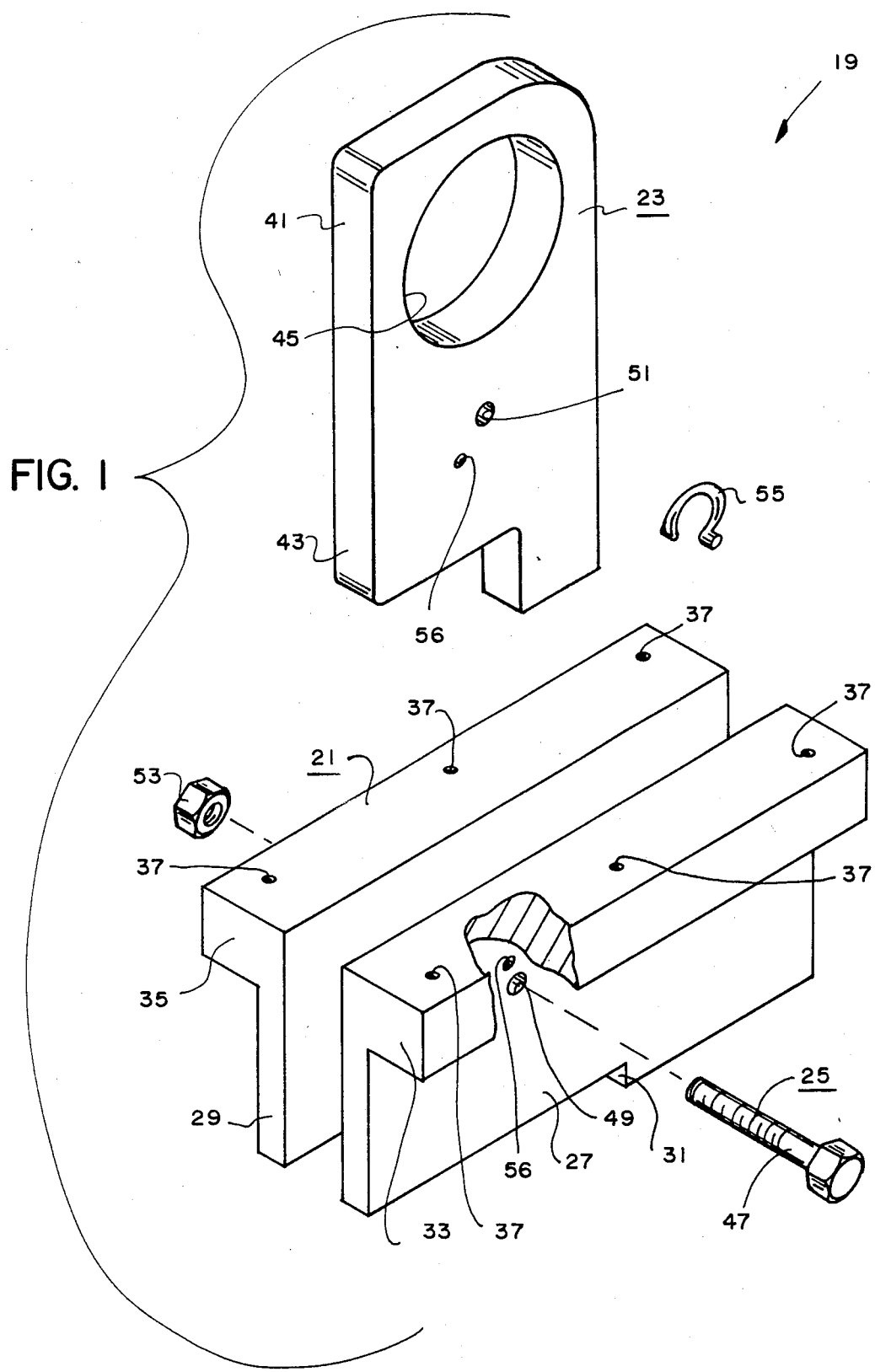
FIG. 1 is an exploded perspective view of a securing device of the securing means of the present invention.
Figure 3:
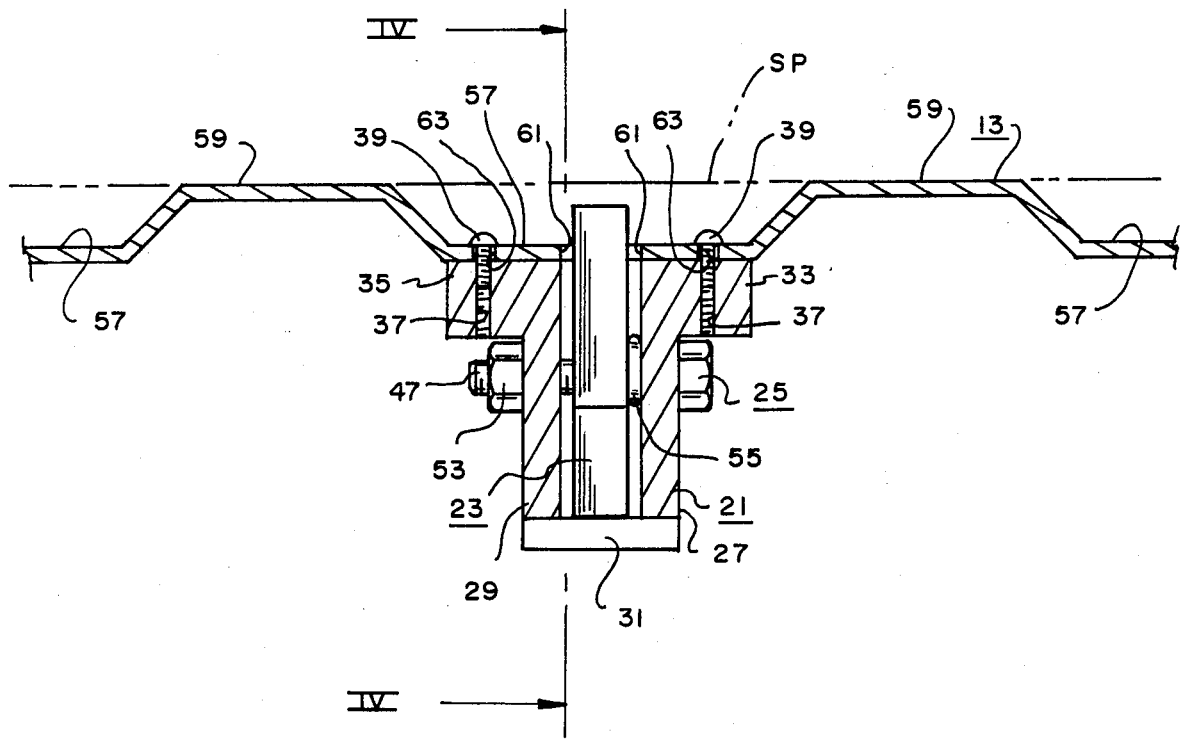
FIG. 3 is an enlarged sectional view substantially as taken on line III—III of FIG. 2.

The body member 21 is preferably mounted directly beneath the elongated slot 61 with the screws 39 extending through apertures 63 in the supporting member 13. It should be noted that the flange members 33, 35 may be shaped so as to mate with the bottom of the valleys 57 of the supporting member 13. Thus, for example, the flange members 33, 35 may be flat as shown in FIGS. 1 and 3 when the valleys 57 have a flat bottom as shown in FIG. 3. On the other hand, it will be appreciated by those having ordinary skill in the art that the valleys and associated ridges of some pickup truck beds have rounded rather than flat surfaces. The flange members 33, 35 may, therefore, be modified to have rounded upper surfaces to properly coact with such supporting members.

Figure 5:
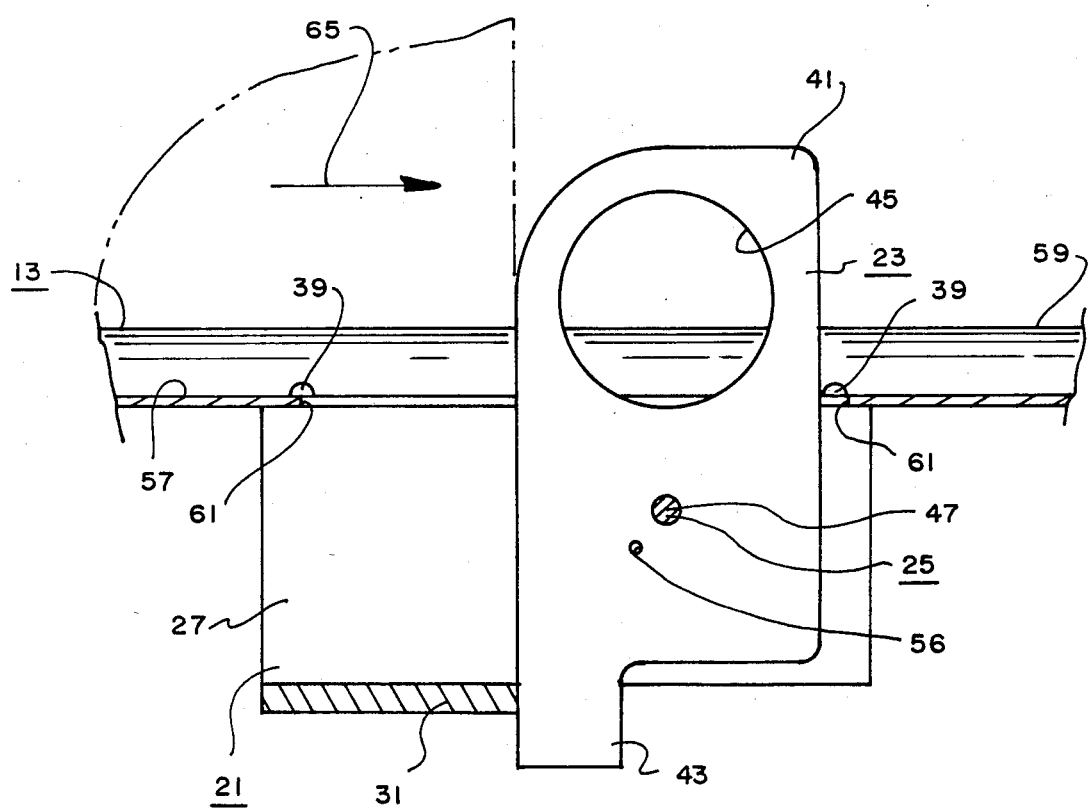
FIG. 5 is a sectional view substantially similar to FIG. 4 but showing the arm member in an up position and used as a stop.
Figure 6:
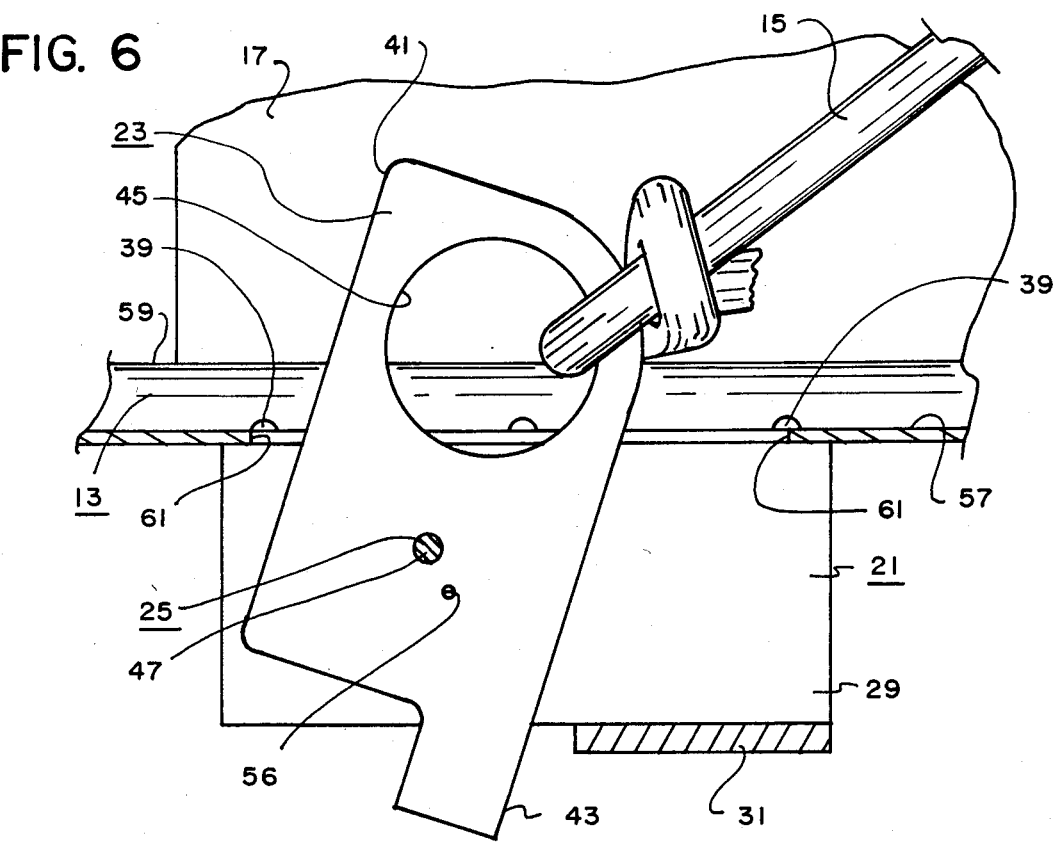
FIG. 6 is an enlarged sectional view substantially as taken on line VI—VI of FIG. 2.
Figure 7:
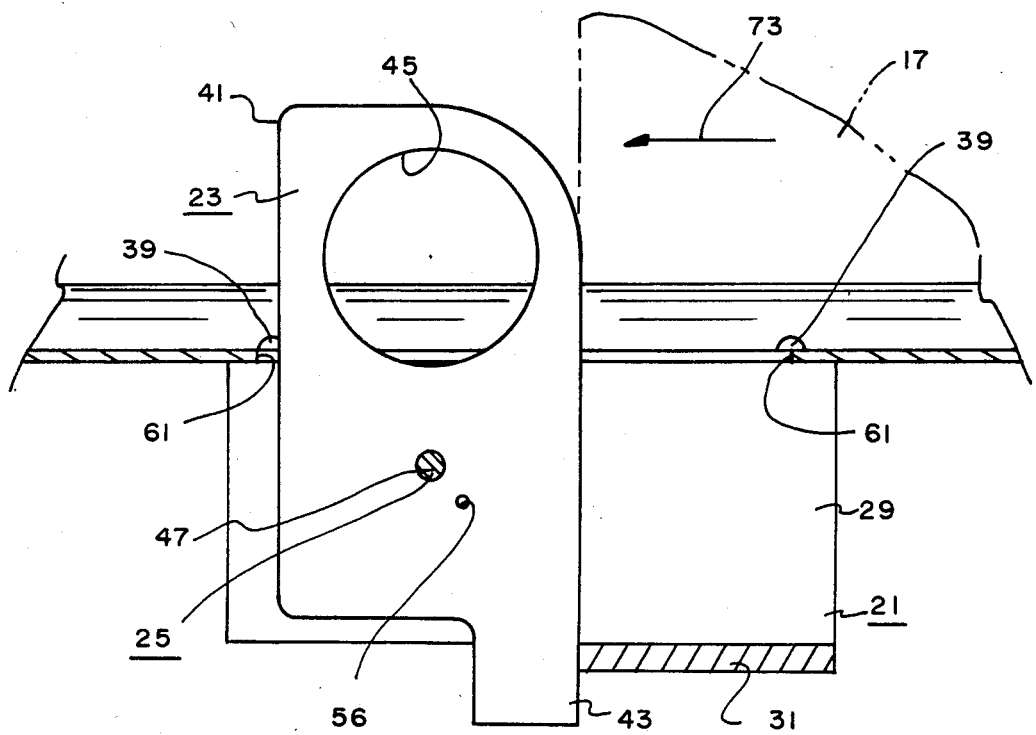
FIG. 7 is a sectional view similar to FIG. 6 but showing the arm member used as a stop.

To utilize the securing means 11 of the present invention once the securing devices 19 have been attached to the supporting member 13 in the desired locations, the first step is to merely apply a downward pressure on the portion 64 of the arm member 23 (see FIG. 4) which will cause the arm member 23 to pivot about the pivot means 25 and cause the first end 41 of the arm member 23 to pivot from the down position toward the up position as will now be apparent to those skilled in the art. Once the first end 41 of the arm member 23 has pivoted upward a sufficient amount, the rope 15 is attached through the aperture 45 to thereby allow the cargo 17 to be tied down to the supporting member 13 in any manner now apparent to those skilled in the art. The devices 19 are preferably arranged so as to act as stops for the cargo 17 in addition to acting as tie-down means. Thus, with the arm members 23 in the up position as shown in FIGS. 5 and 7 and with cargo butted against the first end 41 of the arm members 23 and with the second end 43 of the arm members 23 butted against the bridge member 31, the devices 19 will prevent the cargo 17 from moving in the direction indicated by the arrows 65, 73 thereby acting as stops. When the supporting member 13 is the bed of a pickup truck, the various devices 19 may be arranged as shown in FIG. 2 so that the devices 19 adjacent the tailgate 67 of the pickup truck may act as stops to prevent the cargo from moving in the direction indicated by the arrows 65 toward the tailgate 67 and so that the devices 19 positioned adjacent the cab 71 of the pickup truck may act as stops to prevent the cargo 17 from moving in a direction as indicated by the arrows 73 toward the cab 71. When the cargo 17 is moved away from the arm members 23 and/or the rope 15 disconnected from the first end 41 of the arm members 23, the spring means 55 will cause the arm members 23 to pivot to the down position with all portions thereof located below the top of the ridges 59 so as not to interfere with the support surface or plane SP defined by the top of the ridges 59. The second end 43 of the arm member 23 may be designed so as to reduce the necessary length of the slot 61 while still allowing the arm member 23 to pivot between the up and down positions.

Although the present invention has been described and illustrated with respect to a preferred embodiment thereof and a preferred use therefor, it is not to be so limited since changes and modifications can be made therein which are within the full intended scope of the invention.

I claim:

1. A securing device for use with a supporting member having a support plane to secure cargo to said supporting member, said device comprising:

(a) a body member for being attached to said supporting member; said body member including a pair of spaced-apart, parallel side members, a bridge member rigidly joining said side members to one another, and a flange member rigidly attached to each of said side members, each of said flange members having a plurality of apertures therethrough;

(b) a plurality of screws for extending through said apertures in said flange members of said body member for fixedly attaching said body member to said supporting member with all of said body member positioned below said support plane;

(c) an arm member having first and second ends; and (d) pivot means pivotally attaching said arm member to said body member for allowing said arm member to pivot between a stored position in which all of said arm member is positioned substantially between said side members of said body member below said support plane of said supporting member and an up position in which a portion of said first end of said arm member extends above said support plane of said supporting member for allowing said cargo to be secured relative thereto; said pivot means including a pivot member extending through said side members of said body member and through said arm member at a location intermediate said first and second ends of said arm member and intermediate said first end of said arm member and the center of gravity of said arm member for allowing said arm member to pivot from said down position to said up position when downward force is applied to said second end of said arm member and for causing said arm member to normally fall to said down position due to the force of gravity; said bridge member of said body member forming a stop means for coacting with said second end of said arm member to stop said arm member in said up position and for coacting with said first end of said arm member to stop said arm member in said stored position.

2. The device of claim 1 in which is included spring means for normally urging said arm member to said stored position.

3. The device of claim 2 in which said device is for use with an elongated, flexible member, and in which said first end of said arm member has an aperture therethrough for receiving said flexible member when said arm member is in said up position to allow said cargo to be tied relative thereto.

4. Cargo securing means for use with a supporting member having a supporting plane to secure cargo to the supporting member, said means comprising a plurality of securing devices, each of said securing devices comprising:
   (a) a body member for being attached to said supporting member; said body member including a pair of spaced-apart, parallel side members, a bridge member rigidly joining said side members to one another, and a flange member rigidly attached to each of said side members, each of said flange members having a plurality of apertures therethrough;
   (b) a plurality of screws for extending through said apertures in said flange members of said body member for fixedly attaching said body member to said supporting member with all of said body member positioned below said support plane;
   (c) an arm member having first and second ends; and
   (d) pivot means pivotally attaching said arm member to said body member for allowing said arm member to pivot between a stored position in which all of said arm member is positioned substantially between said side members of said body member below said support plane of said supporting member and an up position in which a portion of said first end of said arm member extends above said support plane of said supporting member for allowing said cargo to be secured relative thereto; said pivot means including a pivot member extending through said side members of said body member and through said arm member at a location intermediate said first and second ends of said arm member and intermediate said first end of said arm member and the center of gravity of said arm member for allowing said arm member to pivot from said down position to said up position when downward force is applied to said second end of said arm member and for causing said arm member to normally fall to said down position due to the force of gravity; said bridge member of said body member forming a stop means for coacting with said second end of said arm member to stop said arm member in said up position and for coacting with said first end of said arm member to stop said arm member in said stored position.

5. The means of claim 4 in which each of said devices include spring means for normally urging said arm member thereof to said stored position.

6. The means of claim 5 in which is included an elongated, flexible member; and in which said first end of said arm member of each of said devices has an aperture therethrough for receiving said flexible member when said arm member is in said up position to allow said cargo to be tied relative thereto.

* * * * *